Patented Dec. 26, 1939

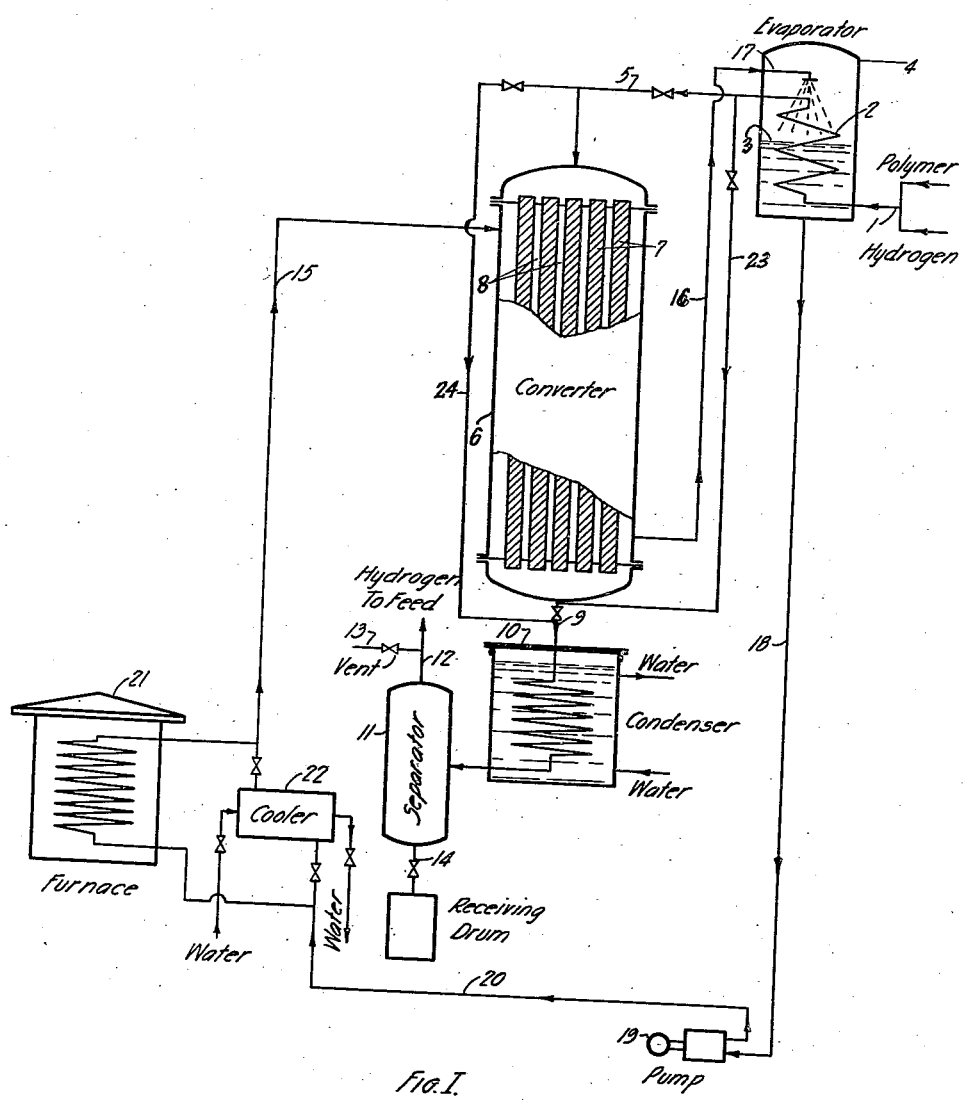

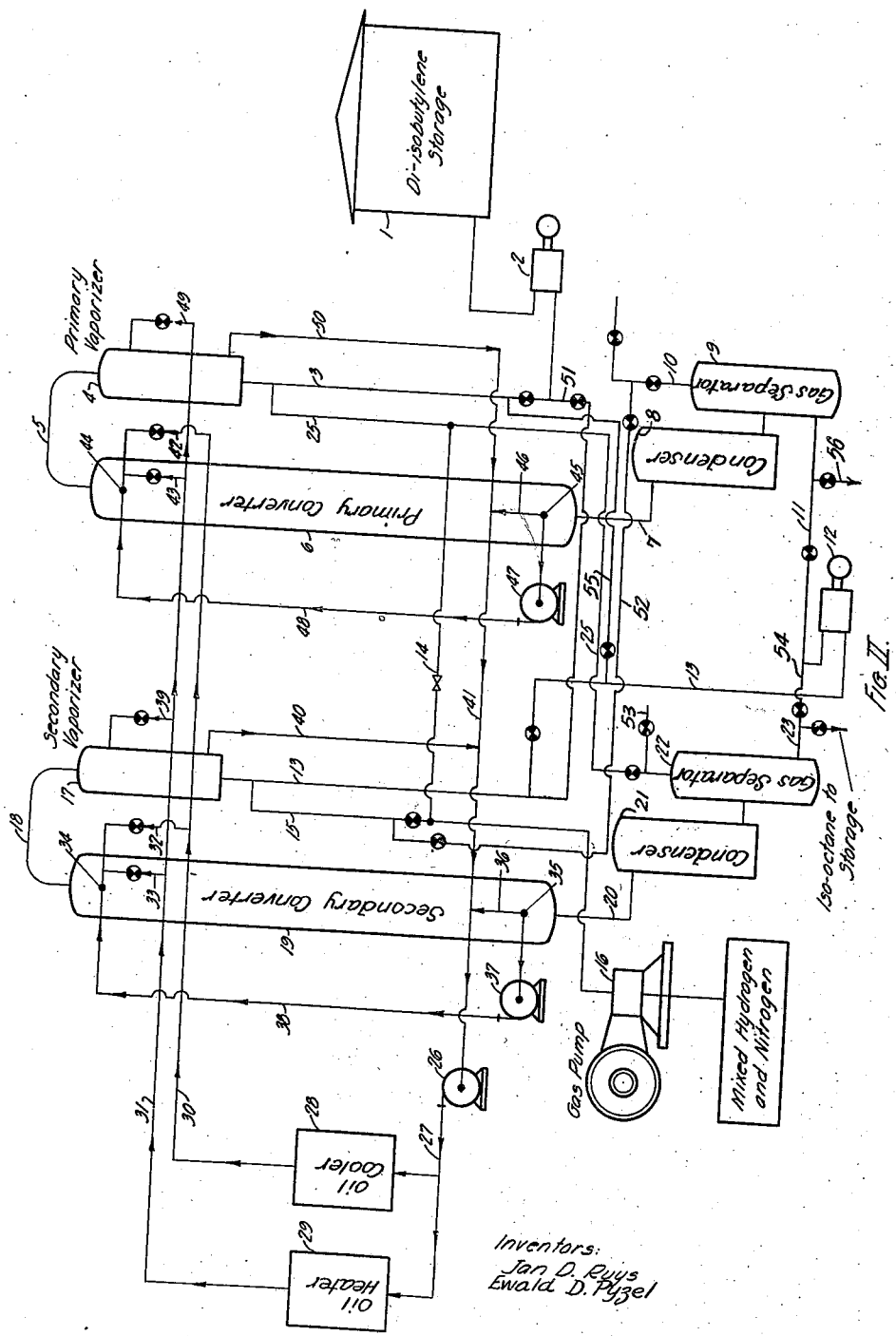

2,184,930

UNITED STATES PATENT OFFICE 2,184,930

PROCESS FOR THE VAPOR PHASE HYDROGENATION OF OLEFIN POLYMERS

Jan D. Ruys and Ewald D. Pyzel, Pittsburg, Calif., assignors to Shell Development Company, San Francisco, Calif., a corporation of Delaware Application May 21, 1935, Serial No. 22,570

2 Claims. (Cl. 260—676)

This invention relates to a novel method for the catalytic hydrogenation of olefin polymers in the vapor phase whereby depolymerization of the starting material may be substantially avoided, the life of the hydrogenation catalyst materially prolonged and the losses of hydrogen greatly reduced while the thermal efficiency of the process is also increased.

The vapor phase hydrogenation of polymeric bodies, particularly olefin polymers, presents many difficulties. Not only are such compounds sensitive to depolymerization by heat which sets a very definite upper limit to the temperature which may be used, but also an equally definite lower limit of operating temperature is fixed by the tendency of most suitable catalysts to be poisoned by small amounts of impurities when used at low temperatures. The exothermic nature of the reaction makes it very difficult to accurately control the reaction and maintain a uniform temperature within the required limits. Furthermore, prior methods of hydrogenation have been found to be inefficient in the use of hydrogen, making them economically impractical for the conversion of olefin polymers to the corresponding saturated hydrocarbons.

We have now found, however, that by suitable adjustment of the operating conditions of the reaction the difficulties of temperature control may be successfully overcome and not only may the vapor phase hydrogenation of olefin polymers be carried out uniformly within a temperature range in which undesirable side reactions such as polymer decomposition and/or catalyst poisoning may be substantially suppressed but also in which important thermal economies may be realized by utilizing the heat of hydrogenation for vaporizing and/or preheating the reactants. We have further found that all these advantages may be combined in a countercurrent-concurrent method of operation in a plurality of stages whereby very high hydrogen efficiencies may be realized while high conversions to saturated compounds may also be obtained.

Our invention may be practiced with any suitable addition product or products of an olefin or its polymer and an unsaturated aliphatic hydrocarbon, which may be vaporized without substantial decomposition, regardless of the source or method of preparation of such addition products. Suitable starting materials which may be advantageously hydrogenated by our process thus include addition products of one olefin with itself (i. e., polymers) or with a different olefin or with other unsaturated aliphatic hydrocarbons. The olefin or olefins used for the preparation of the desired polymer or addition product may be of any degree of reactivity, but our process is most especially advantageous in its application to the hydrogenation of the above defined addition products of tertiary olefins and their polymers, a reaction particularly liable to involve decomposition when carried out in the vapor phase. Thus, ethylene and/or secondary base olefins, i. e., iso and normal olefins which yield secondary derivatives such as propylene, 1-butene, 2-butene, 1-pentene, 2-pentene, 3-methyl-1-butene, and the like, and/or tertiary-base olefins, i. e., iso-olefins, such as isobutylene, 2-methyl-1-butene, 2-methyl-2-butene, etc., which yield tertiary derivatives, may be used either alone or in admixture with each other or with other more reactive unsaturated hydrocarbons such as acetylene and/or diolefins, or with paraffins or other compounds which may be considered inert in the polymerization and/or condensation process. The olefin or olefins used may conveniently be derived from mineral oils, as petroleum, shale oil, and the like, or from mineral oil products, or natural gas, or coal, peat and like carboniferous natural materials, as well as from vegetable oils, fats and waxes. The olefins present in such starting material may be of natural occurrence, the result of catalytic dehydrogenation, vapor or liquid phase cracking, or other pyrogenetic treatment.

Instead of the olefins themselves, the corresponding alcohols, or other derivatives, which yield the olefins and/or polymerization products thereof by suitable treatment, may be used as the source of the desired polymer or polymers.

Polymerization and/or condensation of the chosen olefin or olefins may be effected in a number of different ways depending upon the product or products desired. Resort may be had, for example, to pressure heating, or to treatment with zinc chloride, boron fluoride, phosphoric acid on pumice, and like polymerization agents of high activity, as well as the action of the silent electric discharge, etc. Such methods of operation usually result in the production of highly mixed products so when individual hydrocarbons or isomeric mixtures are desired, we prefer to carry out the polymerization by selectively absorbing the chosen olefin or olefins in a suitable acid acting medium, such as an aqueous solution of

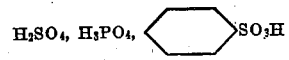

and the like, and then heating the resulting absorption product. The time of contact with such acid agents which will be required for absorption and/or polymerization of the olefin or olefins is dependent on the character of the olefins involved and the nature and concentration of the polymerizing agent used, as well as the temperature at which the operations are carried out. For the production of substantially pure products, for example, it is preferable that the time of contact and temperature of operation be so adjusted to the character and quantity of the more reactive olefin or olefins present and the activity of the polymerizing agent used, that negligible conversion of the less reactive olefins occurs. Where alcohols are used as starting material a similar procedure may be employed. In either case this method of operation permits of accurate control of the polymerization to yield olefin polymers of definite composition, for example, polymers preponderantly composed of dimers or trimers, etc., or mixtures of predictable proportions.

However prepared, the olefin polymers or addition products may be used in our process of vapor phase hydrogenation in a pure state either as the chemical individuals or as pure mixtures or as the crude mixtures containing paraffins or other compounds which are inert in the process or compounds which may undergo simultaneous hydrogenation or other change under the operating conditions used.

Any suitable hydrogenation catalyst may be used in our process. Activated nickel, iron, cobalt, metals of the platinum group, particularly platinum and palladium, copper, chromium, manganese, titanium, molybdenum, vanadium, tungsten and thorium are examples of metal catalysts which are particularly suitable, but other hydrogenation catalysts may also be employed. The catalyst may be used alone as an individual metal or a compound thereof or as a mixture of metals, or a mixture of metals and compounds. Examples of mixed metal catalysts include nickel and molybdenum, nickel and chromium, nickel and manganese, etc., which may be prepared, for example, by reduction of nickel molybdate, nickel chromate, nickel manganate, and the like. Mixtures of iron and nickel are preferably not used because the activity of the mixture is usually less than that of nickel alone. Other typical mixed catalysts are, for example, nickel and silica, nickel and boron oxide, or the like, prepared, for example, by reduction of nickel silicate, nickel borate, etc., or nickel and alumina, prepared, for instance, by the reduction of a mixture of nickel and aluminum compounds. In the preparation of the catalyst advantage may be taken of the promoter action of small amounts of difficultly reducible oxides of heavy metals, or the like. Thoria, ceria, zirconia and titania, for example, are particularly useful as promoters for nickel. The catalyst metal or mixture chosen may advantageously be used in connection with an inert support such as pumice, infusorial earth, glass, porcelain, asbestos, charcoal, and the like, or on a metal support whereby the heat conductivity of the catalyst mass may be improved and control of the catalyst temperature facilitated. Active metal catalysts may be prepared by reduction of the corresponding oxide, hydroxide, carbonate, nitrate, carbonyl, or salt of an organic acid such as the formate, acetate, propionate, oleate, and the like.

In the vapor phase hydrogenation of olefin polymers it is important that the temperature be maintained within a definite, and usually relatively narrow, range. This is particularly true where the polymer or polymeric mixture may contain small amounts of materials which are poisons for the more desirable hydrogenation catalysts, as is usually the case with polymers derived from mineral oil sources which contain sulfur compounds which are very difficult to remove completely. We have found that the danger of such poisoning may be greatly reduced, without resort to expensive methods of treatment for the complete removal of impurities, by carrying out the hydrogenation above certain critical minimum temperatures which vary with different catalysts. Thus, with nickel or nickel-aluminum oxide catalysts, we have found that the life of the catalyst may be very materially lengthened, in fact may be increased more than fifteen times by operating at temperatures of about 170° C. and higher as compared with otherwise similar operations conducted at 150° C. and lower.

Too high temperatures, on the other hand, are equally undesirable not only because of the tendency of olefin polymers to depolymerize at elevated temperatures, but also because high temperatures also adversely affect the life of the catalyst. Highly active metal catalysts are best prepared by low temperature reduction, and operations at temperatures substantially above the reduction temperature reduce the active life of the catalyst. The maximum temperature of operation will, therefore, depend both upon the particular polymer or olefinic addition product being hydrogenated and the nature and method of preparation of the catalyst employed. The choice of operating temperature will also be governed by the degree of saturation desired in the final product, the space velocity which is used, the pressure conditions of operation and the practicality of using inert gases to assist in the control of the reaction temperature. Thus, when it is desired to employ high space velocities at the sacrifice of complete conversion of the polymer to saturated hydrocarbons, higher temperatures may be used than are advisable where substantially completely saturated end products are to be produced. When substantially complete hydrogenation of the polymer is desired, the time of contact generally required is such that temperatures above about 350° C. can seldom be used without danger of excessive depolymerization. We prefer, therefore, to operate within a temperature range of about 170° C. to about 350° C. When it is desired to employ high space velocities, it may be of advantage to operate at temperatures near the upper limit of the allowable range. If low space velocities are employed it is more desirable to operate at temperatures near the lower limit of the range. The term "space velocity" may be defined as the volume of olefin polymer flowing through the apparatus per unit of time, per unit volume of hydrogenation catalyst under standard conditions of temperature and pressure. In general, we prefer to employ temperatures as low as possible, consistent with practicable rates of throughput, as control of the temperature is facilitated thereby.

The particular catalyst, or catalyst mixture chosen may influence the choice of operating temperature not only by its effect upon the rate of hydrogenation but also by its effect upon side reactions. In view of the various factors involved, we preferably employ in operations at about one to two atmospheres absolute pressure with nickel catalysts containing little or no materials of highly active dehydrogenating properties, a temperature range of about 170° C. to about 275° C. for the hydrogenation of di-isobutylene at space velocities of about 0.2 to about 2 volumes per hour per volume of catalyst. With nickel catalysts containing substantial amounts of dehydrogenating agents such as chromic oxide, etc., on the other hand, we prefer to operate in a temperature range of about 170° C. to about 220° C. under otherwise comparable conditions. With polymers having lower hydrogenation rates, such as tri-isobutylene, and with mixed catalysts of the type of Ni—$Al_2O_3$, etc., for further example, a temperature range of about 225° C. to about 275° C. at space velocities of about 0.05 to about 0.5 volume per hour per volume of catalyst, is preferred.

Either atmospheric, superatmospheric, or subatmospheric pressures may be used. Subatmospheric pressures are most advantageous when hydrogenating very highly polymerized olefins which have a tendency to decompose at their normal boiling point. Superatmospheric pressures tend to increase the rate of the hydrogenation reaction. The hydrogenation rate of triisobutylene, for example, is about 25% faster at a pressure of about 115 lbs. per sq. in. than at 35 lbs. per sq. in. We preferably avoid excessively high pressures, however, as the cost of equipment is greatly increased thereby.

Inert gases may be introduced with the reactants to facilitate temperature control and assist in preventing secondary reactions, particularly decomposition reactions. For such purposes any gas or vapor which is inert under the conditions of the reaction may be used, such, for example, as nitrogen, or a highly stable hydrocarbon such as methane, or the like. Alternatively an excess of one of the reactants, i. e., an excess of either hydrogen or olefin polymer or recirculation of a part of the product may be used for the same purpose.

In lieu of, or in addition to, the use of inert diluent gases for absorbing the heat liberated by the reaction, an inert substance of suitable constant boiling point may be introduced with the reactants, or the reaction zone may be surrounded by a selected constant boiling substance which on vaporization absorbs the liberated heat and thereby maintains a substantially constant temperature. Non-boiling baths may be similarly used by providing means for cooling and recirculating the liquid bath medium. Such cooling may be effected in air and/or water cooled spray towers, or tubular heat exchangers, or the like. More advantageously, the heat imparted to the bath by the reaction may be removed by circulating hydrogen and/or the olefin polymer to be hydrogenated through heat exchange elements in heat exchange relation with the bath fluid.

Suitable media which may be used as the bath fluid include high-boiling organic compounds of which petroleum fractions such as lubricating oil fractions and the like, diphenyl, polyalkylated naphthalenes, as di-secondary butyl naphthalene, and the like, are typical, and inorganic materials, such as mercury, lead and like low-melting metals, or metal mixtures such as a 30–70 lead-tin mixture for example, or low-melting alloys, as Wood's metal, bismuth solder, etc., or fused salts as, for example, a eutectic mixture of sodium nitrate and sodium nitrite, or the like. Such baths preferably surround the catalyst tube or tubes in such a manner that uniform cooling is promoted throughout the catalyst zone. This may be facilitated, when a plurality of catalyst tubes are used, by arranging the tubes more compactly near the periphery of the bath, where lower bath temperatures usually exist as a result of cooling by the surrounding atmosphere, than in the interior where such cooling is negligible. Circulation of the cooling medium used may be effected solely by natural convection, as by thermo-syphon effects, or, more advantageously by positive mechanical circulation, as by means of stirring devices, or impellers, or circulating pumps, or the like.

The heat of reaction absorbed by the bath may be removed and advantageously utilized by circulating the heated medium in heat exchange relation with the hydrogen to be used in the reaction. The hydrogen thus preheated may then be used to preheat the olefin polymer to be hydrogenated. The heating in this case being effected by direct contact, for example. Where excess heat above that required for vaporizing the polymer and/or preheating the reaction mixture is to be removed, the cooling may be supplemented by air and/or water cooling or the like and the heated air or water so obtained may be disposed of in any suitable way either being permitted to escape to waste or being used as a source of heat for some other process carried on in proximity to the hydrogenation unit. Instead of using the hydrogen as the principal medium for cooling the temperature regulating bath the polymer to be hydrogenated may be so used. Since olefin polymers are sensitive to over heating, however, it may be more advantageous to use the reaction mixture of both olefin polymer and hydrogen as the bath cooling medium, as the presence of the hydrogen serves to protect the polymer from excessive heating.

In certain cases, especially where the apparatus is not well insulated and heat losses are high, the heat required for vaporizing the polymer and preheating the reaction mixture to the desired temperature may be such as to reduce the temperature of the cooling bath below the optimum for recirculation to the reaction system. Such condition may be rectified by partly preheating the reactants before bringing them into heat exchanging relationship with the bath medium or supplying the bath with heat from an external source before such exchange. More preferably, however, the extra heat is added to the system by re-heating the bath medium just prior to its return to the hydrogenation unit as by this method of operation control of operating temperatures in all parts of the system is facilitated.

The use of one of the reactants in excess to function as an inert diluent to assist in the control of the reaction temperature has already been mentioned. In single stage operations this has some disadvantages. For example, if the olefin polymer is used in excess an incompletely saturated product is obtained which can not be separated into its components by simple fractionation and requires re-circulation for completion of the reaction. On the other hand, if hydrogen-containing gas is used in excess the hydrogen efficiency of the process is low and the accumulation of impurities or diluents present with the hydrogen may seriously interfere with its continued re-use. We have found that these difficulties may be entirely avoided by carrying out the hydrogenation in a plurality of stages whereby all the advantages of countercurrent operation may be obtained. Thus, in a two-stage operation, for example, the first stage of hydrogenation may be carried out in the presence of an excess of polymer using the hydrogen containing gas remaining from the second stage of hydrogenation in which second stage an excess of hydrogen is present over that required for reaction with the partly converted polymer from the first stage. It will be understood that this aspect of our invention is not restricted to olefin polymer hydrogenation alone but may be advantageously employed with any hydrogenatable material, including unpolymerized olefins, aromatic compounds, unsaturated alcohols, and the like.

Our process may be carried out as a batch, intermittent or continuous mode of operation.

Any suitable source of hydrogen may be used for the process. The hydrogen need not be substantially pure since the presence of inert diluents is not detrimental. Suitably purified coke oven gas, oil gas, and the like, or gases obtained by the dissociation of ammonia, or by the dehydrogenation of alcohols etc., may be used as the source of hydrogen for our process. The use of gases of very low hydrogen content may, however, materially reduce the rate of reaction and consequently the capacity of the apparatus. Substantial amounts of oxygen compounds, such, for example, as carbon monoxide and/or water vapor in the hydrogen-containing gases are preferably avoided where nickel-containing catalysts are used, as temporary catalyst poisoning may result therefrom. Catalysts so poisoned may, however, be readily reactivated, by the use of hydrogen substantially free of these materials.

The same general method of precedure may be used to greatly prolong the active life of any catalyst used in vapor phase hydrogenation, whether the cause of its poisoning is due to impurities in the hydrogenatable material used, or in the hydrogen containing gas, or both. By operating with a reaction mixture containing a concentration of catalyst poisons above the critical (i. e., the concentration at which an impurity begins to adversely affect the activity of a catalyst under the conditions of the reaction) for a part of the time, until the activity of the catalyst falls below a predetermined value, and then replacing either one or both of the impure reactants, as required, by material of catalyst poison content below the critical, the activity of the catalyst may be substantially increased and in most cases brought back to the same value which the catalyst would have had if poison free reactants had been used thruout. The less pure reactant or reactants may then be again introduced and the cycle repeated as many times as necessary to maintain the desired average activity, until the structural changes accompanying prolonged heating gradually render reactivation increasingly difficult and the application of more drastic methods, such as the formation of a salt of the metal involved followed by reduction thereof, becomes advisable. By this cyclic method of operation important savings in purification costs may be realized since only a fraction of the total material reacted need be treated. For example, by-product hydrogen from the conversion of alcohols to ketones may be used to replace 90% of the hydrogen used for hydrogenation of di-isobutylene without reducing the yield of iso-octane per pound of catalyst below that obtainable when pure commercial hydrogen is used exclusively. Also, for further example, di-isobutylene of relatively high sulfur content may be intermittently replaced by di-isobutylene of about 0.01% sulfur content or less, with similar saving.

The effluent vapors from the reaction unit or units may be condensed and any gases present therewith separated, in any convenient manner. By passing the polymer to be hydrogenated, with or without hydrogen, in heat exchange relation to such effluent vapors further heat economies may be effected.

For the purpose of affording a clear understanding of our invention it will be described with more particular reference to the hydrogenation of the dimers and trimers of isobutylene, but it will be understood that we are not to be limited thereto as the principles involved are applicable to the hydrogenation of a wide variety of other olefin polymers and addition products. The application of our invention to the hydrogenation of isobutylene polymers may be best explained by reference to the accompanying drawings which are diagrammatic representations of the steps of our process in two typical modifications particularly suitable for the manufacture of iso-octane, isododecane, and the like. Figure I illustrates a single stage process and shows, partly in elevation and partly in section, some details of one suitable type of catalytic converter which may be used. Figure II shows, entirely diagrammatically, a two-stage process in which the hydrogen passes countercurrently to the polymer from one stage to the other.

Referring to Figure I, the olefin polymer or olefin polymer-containing material to be hydrogenated—substantially pure tri-isobutylene will be used as an example—is mixed with hydrogen or hydrogen-containing gas, in this case pure commercial hydrogen, in the feed inlet pipe 1. The hydrogen is preferably used in slight excess, for example, about 1.1 to about 1.5 mols of hydrogen per mol of tri-isobutylene. The mixture of liquid tri-isobutylene and gaseous hydrogen is forced through a heating coil 2 surrounded by a heated bath 3 containing hot oil from the converter as will be more fully described hereinafter. Here the tri-isobutylene is vaporized in the lower submerged coils and the mixed vapors are preheated to the required reaction temperature in the upper exposed coils by the hot oil spray 17. The hot vapors of tri-isobutylene and hydrogen are then conducted via line 5 to a converter 6 where the preheated reaction mixture passes through a plurality of catalyst tubes 7 surrounded by a circulating oil bath 8. The catalyst used in the present case was prepared by saturating porcelain with a solution containing nickel nitrate and aluminum chloride and first roasting and then heating the impregnated porcelain in a stream of hydrogen until the evolution of water vapor became negligible. The entering gases, at a temperature of about 170° C. pass over the catalyst at a rate of about 0.4 volume of liquid tri-isobutylene per hour per volume of catalyst. The effluent vapors from the catalyst tubes 7, pass out through pipe 9 to a water cooled condenser 10 where the isododecane produced and any small amount of remaining tri-isobutylene are condensed and flow to a separator 11 where the unreacted hydrogen is removed through vent pipe 12 and returned to the hydrogen supply (not shown) for reuse. Where the excess hydrogen separated in separator 11 is very small and/or where it is mixed with relatively large amounts of inert gases it may be more economical to vent the separated gas to the atmosphere through valved vent 13 than to attempt to reuse it. Vent 13 may also be used to intermittently eliminate accumulated impurities in the hydrogen when the latter is being recycled. The hydrogenated product containing from about 95 to 99+% iso-dodecane, under the above conditions during the normal life of the catalysts, is withdrawn through drain 14 to storage.

The temperature of the hydrogenation is regulated by an oil bath 8 surrounding and in heat exchanging relation with the catalyst tubes or zones 7, already mentioned. This bath is continually supplied with oil at about 200° C.–240° C. which circulates around the catalyst tubes 7 at a rate sufficient to maintain the reaction zone at a uniform desirable temperature. Under the conditions of one typical run, the temperature of the vaporized, hydrogenated product was about 225° C. to about 240° C. The oil is withdrawn through pipe 16 and conducted to the evaporator 4 where the hot oil is sprayed over the exposed coils of the heat transfer element 2 to preheat the vaporized reaction mixture therein and is then collected around the lower coils of the vaporizing tube wherein the tri-isobutylene is vaporized and finally withdrawn, much cooled, through pipe line 18 and pumped by pump 19 and line 20 to furnace 21 or cooler 22 wherein the temperature of the oil is adjusted to the proper value, and returned to bath 8 for a repetition of the cycle. By this method of operation, not only may high conversions be obtained at high rates of throughput but also long catalyst life may be obtained.

In the modification of our invention illustrated by Figure II, substantially pure di-isobutylene, for example, is fed from storage tank 1 by pump 2 and pipe line 3 to a primary vaporizer 4. Before entering the vaporizer 4, hydrogen-containing gas, from the secondary converter as will be described in greater detail later, is admixed with the di-isobutylene. This gas may be of relatively low hydrogen content because complete conversion of di-isobutylene to iso-octane in the first converter is not contemplated. In the primary vaporizer 4 the di-isobutylene is vaporized and the mixture of di-isobutylene vapor and hydrogen-containing gas is preheated by hot circulating oil. The mixture of gaseous reactants then passes by pipe line 5 to the primary converter 6 which may be of the same type as that described in connection with Figure I. With the large excess of polymer present, the hydrogen is substantially completely reacted but the conversion of di-isobutylene is relatively low. The reacted mixture leaves the converter in vapor form through pipe 7 and is condensed in condenser 8 and flows to separator 9 where any gases present are vented to the atmosphere through valved line 10. Such gases will be largely the inert constituents of the hydrogen-containing gas originally used since the hydrogen will have been practically consumed. The partly converted di-isobutylene is pumped by pump 12 through lines 11 and 13 to the secondary vaporizer 17. Hydrogen or hydrogen-containing gas, for example, a mixture of 75% hydrogen and 25% nitrogen such as is obtained by dissociation of ammonia, is added by pipe line 15 from pump 16, to the partially converted polymer preferably in about the stoichiometric proportion for reaction with the original unconverted di-isobutylene feed to the primary converter 6 or a very small excess thereover, for example, 1 to 2% excess. Larger excesses of hydrogen may, of course, be used but little advantage is gained thereby and the hydrogen losses are materially increased unless provision is made for recovery of such excess from the waste gases discharged at 10. So in the preferred method of concurrent-countercurrent operation, the hydrogen fed to the converter in 5 which the final hydrogenation is effected is equivalent to the polymer feed to the primary converter, and therefore represents a substantial excess of hydrogen over that required for hydrogenation of the unreacted polymer present in the final converter. This unreacted excess of hydrogen serves, at least in part, as the hydrogen containing gas used to effect the initial partial hydrogenation of the polymer.

Many advantages may be obtained by careful adjustment of the operating load on the converters so that each performs an equal share. In this way not only may the average life of the catalyst in the converters be prolonged, but also the control of the operating temperature is greatly facilitated since approximately the same amount of heat will be generated in each unit. Balanced operation of the two converters shown in Figure II may be facilitated by the introduction of additional, fresh, hydrogen-containing gas to the primary converter via valved line 14 and the regular hydrogen feed line 25. In order to insure balanced operation, the addition in this way of a slight excess of hydrogen above the stoichiometric requirement for reaction with half of the polymer material present in the primary converter may be justified under some conditions in spite of the hydrogen losses which may result therefrom. In some cases less than stoichiometric amounts of hydrogen calculated on the polymer feed to the primary converter may be added in the secondary converter and the remainder and/or any desired excess may be fed directly to the primary hydrogenating unit as by line 14. An important feature of this widely applicable step of our procedure is the presence in the first hydrogenation stage of a substantial stoichiometric excess of hydrogenatable compound over hydrogen, while the reverse relationship is maintained in the last hydrogenation stage. In two stage operations, most preferably the feed to the primary converter is hydrogenatable compound and hydrogen in a molecular ratio of about two to one, and the feed to the secondary converter is these reactants in the ratio of about one to two.

In the secondary vaporizer 17, the partly converted di-isobutylene is again vaporized and preheated as described for the primary vaporizer 4. The reaction mixture, at substantially reaction temperature, is then conducted by pipe line 18 to the secondary converter 19 where, due to the presence of an excess of hydrogen the conversion of di-isobutylene to isooctane may be made very complete. The reaction product passes out through pipe line 20 to condenser 21 and separator 22. Iso-octane is drawn off through pipe line 23 and the unreacted hydrogen and admixed nitrogen is sent by pipe line 25 to be mixed with the incoming di-isobutylene in line 3. The reaction temperatures in converters 6 and 19 may be controlled, and the polymer vaporization effected, in the same manner as described in connection with Figure I. A somewhat more flexible system which accomplishes the same result is shown, however, in Figure II. In this case a suitable oil such as used lubricating oil or the like, is circulated by pump 26 through pipe line 27 to a cooling device 28 and/or a heater 29. After suitable adjustment of the oil temperature in these devices, the oil passes by pipe lines 30 and/or 31, to the valved branch lines 32 and 33. By proper manipulation of the valves in these branch lines the temperature of the oil entering the converter bath at 34 may be varied over a very wide range. After circulating in heat transferring relationship with the catalyst zones of converter 19, the oil is discharged at 35 and divides, a part flowing by pipe lines 36 and 41 to pump 26 for return to the heating and/or cooling system, and the remainder going to pump 37 and line 38 for recirculation in admixture with the incoming oil from 32 and 33 through the converter bath. In the meantime the hot oil in line 31 is also withdrawn through valved branch pipe line 39 to effect preheating of the reaction mixture and vaporization of the partly converted di-isobutylene in the secondary vaporizer 17. The oil is substantially cooled in these operations and passes out by line 40 to join pipe line 41 for return to pump 26 and a repetition of the cycle. A similar system of reaction temperature control and preheating and vaporization is used in the primary stage. Corresponding elements in the oil circulation system of the primary converter and vaporizer are designated in Figure 2 by members ten higher than the same elements in the secondary system above described.

It will be evident that this method of temperature control permits of very accurate control with great heat economy. Not only may the temperature of the oil leaving the cooler and/or heater be varied widely and either of these elements be completely shut off from the system but also further modification of the oil temperature in the converters may be effected by controlling the relative amount of oil recirculated by pumps 37 and 47 as compared with the total oil input at 34 and 44. At the same time vaporization and preheating of the reaction mixtures are effected essentially by the heat of reaction absorbed in controlling the temperature of the converters.

When operating by the above described concurrent-countercurrent procedure, either the same, or different hydrogenation catalysts may be used in the converters or hydrogenation catalyst zones. Under some conditions it may, for example, be advantageous to have catalysts of different susceptibilities to poisoning and/or different reactivities present in the different converters. In such cases the temperature of operation and/or other conditions may be varied in the different converters to meet the requirements of the different catalysts. Furthermore, whether operating with the same catalyst in each zone or not, it may sometimes be desirable to alter the order of operation and use the converter in which the primary hydrogenation has been effected to carry out the secondary stage of hydrogenation and vice versa. Thus in the arrangement shown in Figure II the di-isobutylene feed may be pumped by by-pass line 51 connecting with line 13 feeding to vaporizer 17 and the primary hydrogenation effected in converter 19 by means of hydrogen supplied by line 52, the partially hydrogenated product being condensed and gases separated as before. Non-reactive gases may be vented via line 53 while the partially hydrogenated polymer is fed by line 54 to pump 12 and thence by lines 13, 55 and 3 to vaporizer 4 with hydrogen-containing gas supplied from lines 14 and 25. The final product during such a reversed cycle is withdrawn by line 56. This method of operation is an advantageous supplement to the previously described cyclic procedure using reactants of different purities, and may in some cases of purely temporary catalyst poisoning entirely obviate it. The same principle may be applied when only one hydrogenation catalyst chamber is used. Thus in the method of operation illustrated by Figure I, for example, with impure reactants introduced thru pipe line 5, the activity of the catalyst at the upper end of the converter will be most noticeably affected and the reacted product leaving via line 9 will be essentially freer of those impurities which were responsible for this loss in catalyst activity. After the catalyst activity in the upper end of converter 6 has fallen to a predetermined rate, the flow of reactants may be reversed by means of valved by-pass lines 23 so that the reactants are introduced thru line 9 and the reacted mixture withdrawn thru a part of line 5 by a by-pass line 24 connecting with line 9. The activity of the catalyst in the lower part of the converter will now gradually decline if catalyst poisons are present in the reactants but the activity of that part of the catalyst mass at the top (now the exit) will be gradually restored due to the presence of relatively poison free reactants in that zone. The impurity content of the product will then approximate that of the feed until the activity of the catalyst at the lower end of the converter has declined to the point where another reversal of flow is desirable.

The foregoing illustrative examples are not to be construed as limitations on our invention by virtue of any detail therein specified as various permissible deviations therefrom will be evident to those skilled in the art of hydrogenation. For example, various changes may be made in the arrangement of apparatus, such as placing the olefin polymer vaporizing coils within the hydrogenation unit or units either to function there as a cooler for the bath medium or to take the place in part or in whole of the bath fluid itself. Furthermore, while emphasis has been placed upon the more advantageous continuous methods of operation, substantially the same ultimate results may be had by intermittent or batch methods of operation, as where, for example, the process illustrated by Figure II is carried out using only one catalytic converter and storing the various reactants between the various operating stages. Furthermore, while the concurrent-countercurrent method of procedure has been specifically described in connection with a two-stage process, it will be apparent that a larger number of stages may be used, it being only desirable in this feature of our invention that the less readily condensable (i. e., free hydrogen containing) components of the later hydrogenation stages in which more complete conversion of the material undergoing hydrogenation is effected be used, for the sake of greatest economy, in an earlier hydrogenation stage. That is, irrespective of the number of hydrogenation steps, it is advantageous to effect a separation of unreacted gases after each and to carry out the final or completion of the hydrogenation with fresh hydrogen containing gas. Preferably hydrogen separated from the reacted mixture of a preceding hydrogenation catalyst zone (i. e., a zone in which the hydrogenation of the hydrogenatable compound is more complete) will be present in all the hydrogenation zones except the final zone. Most preferably the hydrogen thus added in a plurality of hydrogenation zones will represent in total, as has already been emphasized, approximately the stoichiometric requirement for reaction with the original hydrogenatable compound or material used.

As has been indicated, a wide variety of olefin polymers and condensation products of olefins may be successfully hydrogenated by the above or other modifications of our invention by proper adjustment of the operating conditions. Not only may other tertiary olefin polymers, such as di and tri amylenes and hexylenes and the like, be thus treated, but also polymers of less reactive olefins and olefin condensation products such, for example, as the iso-nonenes produced by interaction of isobutylene with tertiary amylenes, or isoheptylene which may be obtained by reaction of iso-butylene with propylene, etc., or octylenes obtained by the reaction of secondary butylene with a tertiary butylene may be similarly hydrogenated, as well as like products of higher homologues and analogues and higher polymerization and/or condensation products.

Our process offers many advantages. It is particularly useful for the conversion of unstable gum forming olefine polymers and/or condensation products into stable saturated hydrocarbons of high anti-knock value eminently suitable for use as motor fuel and the like. These valuable products may be prepared by our method at very high efficiency of both heat and reactants.

While we have in the foregoing described in some detail the preferred embodiment of our invention and some variants thereof, it will be understood that this is only for the purpose of making the invention more clear and that the invention is not to be regarded as limited to the details of operation described, nor is it dependent upon the soundness or accuracy of the theories advanced as to the advantageous results attained. On the other hand, the invention is to be regarded as limited only by the terms of the accompanying claims in which it is our intention to claim all novelty inherent therein as broadly as is possible in view of the prior art.

We claim as our invention:

1. In a continuous process for effecting the vapor phase hydrogenation of an unsaturated hydrocarbon to the corresponding saturated compound in the presence of an active hydrogenation catalyst when the unsaturated hydrocarbon to be hydrogenated contains more than a critical concentration of a catalyst poisoning impurity which poisons the catalyst by forming a loose association therewith, the steps which comprise passing the vapors of the unsaturated hydrocarbon, together with an effective amount of free hydrogen, in one direction through a mass of the catalyst under hydrogenation conditions and continuing the hydrogenation until the activity of the catalyst has decreased to a predetermined minimum practical value due to temporary poisoning of that part of the catalyst mass which first comes into contact with the material to be hydrogenated, then reversing the flow of the unsaturated material and hydrogen and passing it in the opposite direction through the same catalyst mass under hydrogenation conditions so that it first contacts that portion of the catalyst mass which still has substantially its initial activity and continuing the hydrogenation until the activity of the catalyst has decreased to a predetermined minimum practical value, then again reversing the flow and continuing the cycle as described whereby the end of the catalyst mass which first contacts the material to be hydrogenated progressively loses activity while the opposite end of the same catalyst mass is being reactivated while substantially complete hydrogenation of the unsaturated hydrocarbon is being effected, and the activity of the catalyst is maintained within a practical operating range.

2. In a multi-stage continuous process for effecting the vapor phase hydrogenation of an unsaturated hydrocarbon compound to the corresponding saturated hydrocarbon in the presence of an active hydrogenation catalyst when the unsaturated hydrocarbon to be hydrogenated contains more than a critical concentration of a catalyst poisoning impurity which poisons the catalyst by forming a loose association therewith, the steps which comprise passing the vapors of the unsaturated organic hydrocarbon, together with an effective amount of free hydrogen, successively through a plurality of hydrogenation stages containing a hydrogenation catalyst under hydrogenation conditions and continuing the hydrogenation until the activity of the catalyst in the first of the series of hydrogenation stages has decreased to a predetermined minimum practical value due to poisoning, then changing the order of the hydrogenation stages so that the original second becomes the first stage and the original first stage becomes the final stage and continuing the hydrogenation until the activity of the catalyst in the original second stage has decreased to a predetermined minimum practical value due to poisoning, and continuing the cycle as described whereby the catalyst in the first of the series of hydrogenation stages progressively loses activity while the catalyst in the last of the series of hydrogenation stages is being reactivated and while substantially complete hydrogenation of the unsaturated hydrocarbon is being effected and the out-put of the system is kept substantially constant by maintaining the activity of the catalyst within a practical operating range.

JAN D. RUYS.
EWALD D. PYZEL.